United States Patent [19]

Huttenhow

[11] 4,295,385

[45] Oct. 20, 1981

[54] PIVOTED LEVER ACTUATOR

[76] Inventor: George H. Huttenhow, 4630 Fillmore St., Denver, Colo. 80216

[21] Appl. No.: 114,056

[22] Filed: Jan. 21, 1980

[51] Int. Cl.[3] .......................... G05G 9/02; G05G 1/14; F16C 1/12

[52] U.S. Cl. .................................. 74/478; 74/501 R; 74/512; 74/560; 114/160

[58] Field of Search ...................... 74/501 R, 512, 560, 74/478, 487, 506; 114/160

[56] References Cited

U.S. PATENT DOCUMENTS

| | | | |
|---|---|---|---|
| 1,765,891 | 6/1930 | Waggoner | 74/560 |
| 2,865,223 | 12/1958 | Kope | 74/478 |
| 3,002,398 | 10/1961 | Beamer | 74/487 |
| 3,110,193 | 11/1963 | Bratz | 74/487 |
| 3,503,275 | 3/1970 | Morse | 74/501 |
| 3,747,428 | 7/1973 | Waner et al. | 74/501 |

*Primary Examiner*—Kenneth Dorner
*Attorney, Agent, or Firm*—Richard D. Law; Bruce G. Klaas

[57] ABSTRACT

A stationary base plate having an attached pivotable plate, and a cable secured around a circular flange depending from the pivotable plate has its extending ends lengthened or shortened on pivoting the pivotable plate. With the cable ends secured to opposite sides of a pivoted lever device, it may be pivoted by turning the pivotable plate.

5 Claims, 7 Drawing Figures

PIVOTED LEVER ACTUATOR

This invention relates to the means for remotely activating pivoted levers which control various mechanisms, such as a rheostat, on-off pivot switches, steering means, etc.

THE INVENTION

A rotatable or pivotable plate, mounted on a base with a cable reeved around a depending circular flange on the pivotal plate, provides means for pulling either end of the cable while lengthening the other end of the cable. With the ends of the cable attached to a pivoted lever, it may be pivoted by turning the pivotable plate. When the cable is of substantial length and is secured to a pivoted lever mechanism, it provides a remote control for the lever mechanism, operable by foot, hand, or the like. The diameter of the flange supporting the cable determines the leverage applied to the pull cable so that force to be applied to the lever is controllable.

Objects and Advantages of the Invention

Included among the objects and advantages of the invention is to provide a remote controller for pivotal, lever type mechanisms.

Another object of the invention is to provide a pivotable activator for cable control elements.

Still another object of the invention is to provide a rotatable turntable for a cable controller, providing to and from movement for the ends of the cable.

An additional object of the invention is to provide a portable, remote cable controller for a pivoted lever, operable by hand or foot.

A further object of the invention is to provide a simple, easy to operate, cable activator for pivoting a pivoted lever mechanism.

These and other objects and advantages of the invention may be ascertained by reference to the following description and appended drawings.

GENERAL DESCRIPTION OF THE DRAWINGS

SPECIFIC DESCRIPTION OF THE INVENTION

Figure 1:
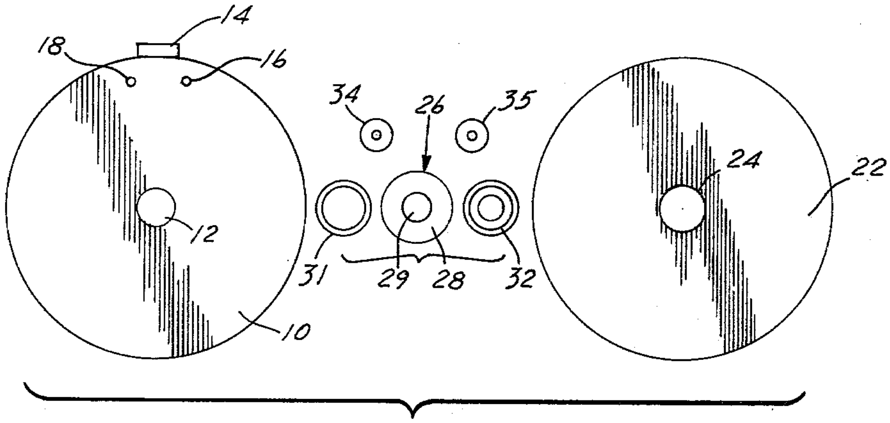
FIG. 1 is an exploded top plan view of the parts of the cable controller of the invention showing one side of the two disc portions.
Figure 2:
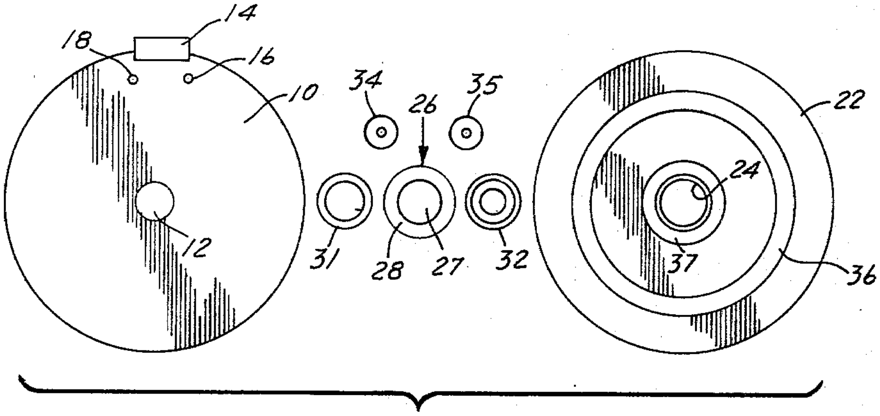
FIG. 2 is an exploded top plan view of the opposite side of the parts.
Figure 4:
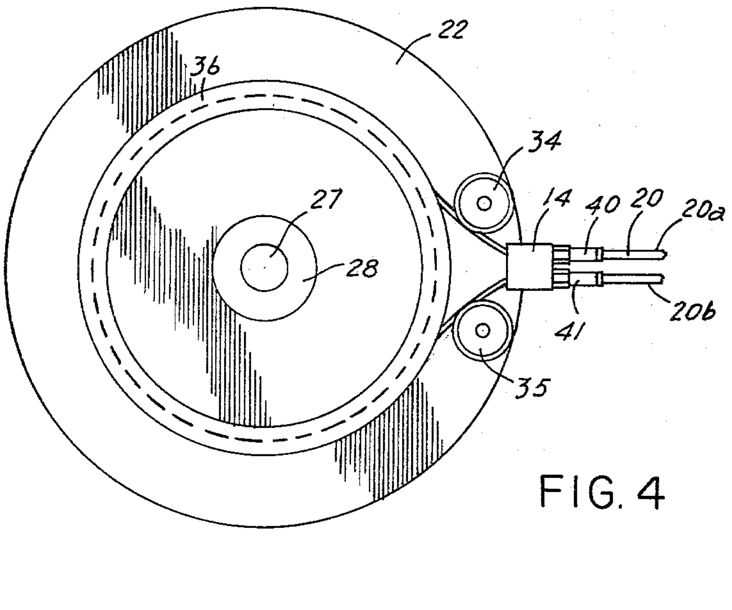
FIG. 4 is a top plan view of a partially assembled cable controller, showing the positioning of the cable on a rotatable disc.
Figure 3:
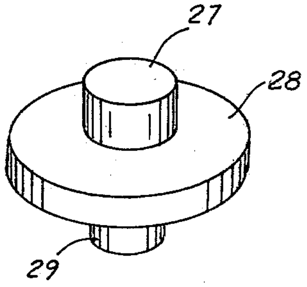
FIG. 3 is a perspective, detail view of the axle arrangement for the unit.
Figure 7:
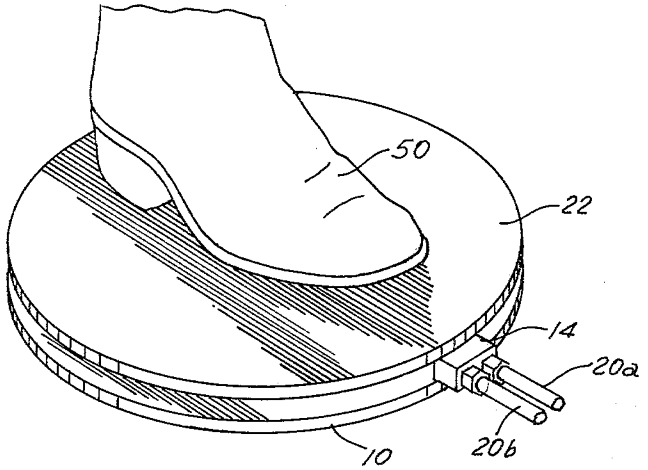
FIG. 7 is a perspective view of one mode of operation of the controller of the invention.
Figure 5:
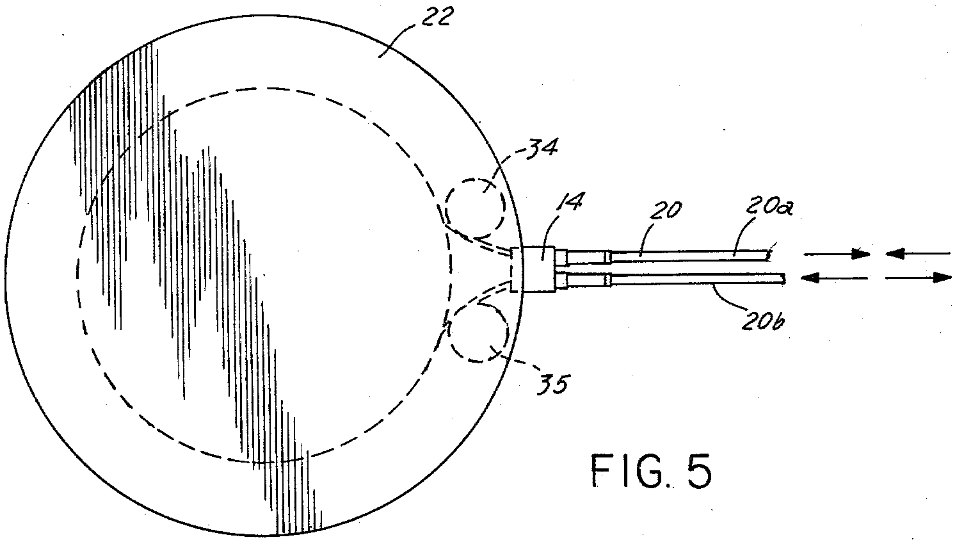
FIG. 5 is a top plan view of an assembled cable controller according to the invention.
Figure 6:
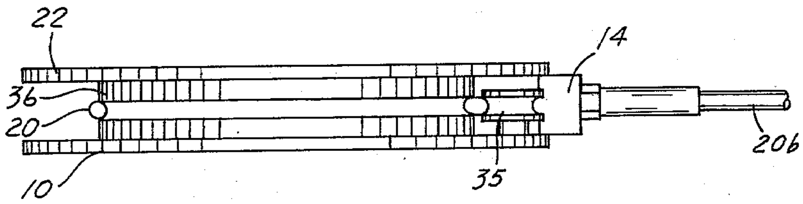
FIG. 6 is a side elevational view of the device of FIG. 5.

In general, the cable controller of the invention is illustrated in the drawings, showing a stationary base and a pivotable or rotatable cable holding member mounted on the base, with a cable reeved around a cable support mounted on the top member with two free ends of the cable extending beyond the unit. Specifically, a circular base plate 10 includes a central axle bore 12 and a cable holding device 14 for the entrance and exit of a cable 20 (FIG. 4). Adjacent the cable holder mounted on the plate 10 is a pair of pins 16 and 18 rotatably holding rollers 34 and 35 for permitting easy passage of the cable into and out of the cable holder. A top circular, rotatable member 22 includes a central bore 24 for accepting an axle member, shown generally by numeral 26. The axle member 26 includes a top axle portion 27, a spacer portion 28 and bottom axle portion 29. The top axle portion 27 fits bore 24 and the bottom axle portion 29 fits bore 12, with the spacer 28 spacing the upper and lower plate members. Ball bearing set 31 seats around axle 27 and ball bearing set 32 seats around axle 29 for smooth rotary action of the top plate.

The pair of rollers 34 and 35 seat on roller pins 16 and 18, and these rollers are grooved to the size of the cable for holding the cable in place. A bearing set holding flange 37 is secured to the plate 22 and is concentric with the bore 24. This holds the bearing set 31 between the plate 22 and spacer 28 of the axle 26. A grooved cable holding ring 36 is affixed to the plate 22 for holding a cable passed therearound.

One stretch of the cable 20 passes through cable guide tube 40 (FIG. 4) mounted on guide 14 and then through holder 14. The cable is reeved around guide roller 34, around the cable flange 36, and then around guide roller 35. The cable passes out the holder 14 and out the cable guide tube 41. Guide tube 41 is affixed to the holder 14. This provides cable ends **20*a* and 20*b***, extending any desired distance beyond the unit. The cable ends may extend to the length desired and are affixed to a pivoted mechanism.

For use, the device is placed on a support surface, for example a floor, and the cable ends **20*a* and 20*b* are fastened to a pivoted control bar, as for example an on-off switch for a drill press or other machine tool, not shown. With the cable taut, an operator's foot 50** is placed on the top plate and the top plate is easily rotated by turning the operator's foot. By turning the foot, the operator turns the top plate in either direction, shortening one cable end and lengthening the other. This pivots the pivoted controller in one direction or the other.

The unit may be used for various mechanisms that may be controlled in a pivoted manner. For example, the cables may be attached to a trolling outboard motor in a boat, and a standing fisherman may direct the boat by foot movement. Thus, a "hands-off" steering is possible, leaving the hands free for the fishing tackle. Other uses will be obvious when a pivoted controller is used, particularly when both hands of the operator are engaged, the use of a mechanism and foot control is available. Thus, a motor drive may be variably controlled by a rheostat controlled by the unit of the invention.

What is claimed is:

1. Pivotable control means for a cable actuator comprising:
   - (a) circular base plate means for resting on a surface without attachment;
   - (b) circular rotatable top plate means with a planar top surface mounted for free rotation on and in close proximity said base plate means;
   - (c) circular cable support ring means depending from and rotatable with said top plate means positioned between said bottom and top plate means, and said ring means being slightly smaller than said top plate means including a cable support groove;
   - (d) cable guide means mounted on said base plate means for passing a cable onto and from said cable support ring means, providing two free cable ends beyond said unit; and (e) guide roller means mounted adjacent said cable guide means for simultaneously guiding two stretches of a cable through said cable guide means and onto said support ring means.

2. Pivotable control means for a cable actuator according to claim 1, wherein ball bearing sets support said top plate means on said bottom plate means for free rotation.

3. Pivotable control means for a cable actuator according to claim 1, wherein said bottom and said top plate means are circular and of the same diamter.

4. Pivotable control means for a cable actuator according to claim 1, wherein said cable guide means include tubular guides for separating and holding separate stretches of a cable.

5. Pivotable control means for a cable actuator according to claim 1, wherein said guide roller means are mounted on said base plate means.

* * * * *